United States Patent
Baumann et al.

(10) Patent No.: US 6,350,824 B1
(45) Date of Patent: Feb. 26, 2002

(54) PROCESS FOR CONTINUOUS POLYMER-ANALOGOUS REACTIONS

(75) Inventors: Frank Baumann, Mehring; Otto Rothenaicher, Zeilarn; Bernward Deubzer, Burghausen; Monika Heindl, Haiming, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/290,214

(22) Filed: Apr. 13, 1999

(30) Foreign Application Priority Data

Apr. 16, 1998 (DE) .......................... 198 16 921

(51) Int. Cl.$^7$ .......................... C08L 83/05; C08L 83/07
(52) U.S. Cl. ...................... 525/479; 526/64; 525/326.1; 528/31; 528/15; 528/32; 556/479; 549/215
(58) Field of Search ............................... 525/479, 326.1; 526/64; 528/31, 15, 32; 556/479; 549/215

(56) References Cited

U.S. PATENT DOCUMENTS

| | | | |
|---|---|---|---|
| 3,853,934 A | | 12/1974 | Siciliano et al. |
| 4,005,046 A | * | 1/1977 | Chandra et al. |
| 4,128,568 A | | 12/1978 | Buchner et al. |
| 4,230,892 A | | 10/1980 | Pruckmayr |
| 5,206,308 A | * | 4/1993 | Auerbach et al. |
| 5,212,255 A | * | 5/1993 | Khouri et al. |
| 5,986,022 A | * | 11/1999 | Austin et al. |
| 6,028,146 A | * | 2/2000 | Kotlar et al. |

FOREIGN PATENT DOCUMENTS

| | | |
|---|---|---|
| DE | 27 05 563 A1 | 8/1978 |
| EP | 0 382 366 A2 | 8/1990 |
| WO | 98/05700 * | 2/1998 |
| WO | 98 05 700 A1 | 2/1998 |

OTHER PUBLICATIONS

M. Bogdan et al., "Catalysis of hydrosilylation XIII.* Gas-phase hydrosilylation of acetylene by trichlorosilane on functinoalised silica supported rhodium and reuthenium phosphine complexes". Applied Organometallic Chemistry (1987) 1 267–273.

Kirk–Othmer, Encyclopedia of Chemical Technology, J. Wiley & Sons, 4$^{th}$ Edition, vol. 20, pp. 1007–1059. (1998).

* cited by examiner

*Primary Examiner*—Robert Dawson
*Assistant Examiner*—Kuo-Liang Peng
(74) *Attorney, Agent, or Firm*—Brooks & Kushman P.C.

(57) ABSTRACT

A continuous process for the polymer-analogous reaction of polymers bearing functional groups with reactive compounds, wherein in a first step, a mixture is prepared from the polymers bearing functional groups and the reactive compounds, and in a second step, the mixture is conducted continuously through a reaction zone and brought to reaction there.

12 Claims, 1 Drawing Sheet

PROCESS FOR CONTINUOUS POLYMER-ANALOGOUS REACTIONS

TECHNICAL FIELD

The invention relates to a continuous process for the polymer-analogous reaction of polymers bearing functional groups with reactive compounds.

BACKGROUND ART

Continuous processes are widely used in the chemical industry, where they are superior to batch processes due to improved space-time yield, increased flexibility, and with respect to safety considerations, because of the product quality and/or the product mass to be dealt with. A further advantage of continuous processes is that the quality of the resultant product can be controlled by on-line analysis during the running production process, by changing reaction parameters such as flow rate, temperature, etc.

The continuous processes which have been described hitherto in the chemical industry involve the reaction of monomeric compounds to give novel but likewise monomeric compounds, or involve the preparation of polymers from monomers and/or oligomers, e.g. by polycondensation or polymerization.

Examples of the first process from silane chemistry are the continuous gas-phase hydrosilylation of silanes by compounds bearing organic double bonds or triple bonds, e.g. hydrosilylation of a trichlorosilane by acetylene, disclosed by M. Bogdan et al., Appl. Organomet. Chem. 1 (3), 1987 pp. 267 to 73. In these processes, the starting materials are always, gaseous or low-viscosity compounds under reaction conditions. In general, the products have similar properties as well. In the case of volatile starting materials (b.p. <200° C. at 1 mbar pressure), a portion of starting material which is not completely reacted when so-called loop reactors are used must be recirculated to the reaction circuit. This leads, for example, to a low space-time yield, to a longer mean residence time, and to a longer thermal stress on the product.

For polymer preparation, there are likewise a number of different continuous processes. Thus, for example, EP-A-382 366 describes the hydrolysis and condensation of dimethylchlorosilanes to give oligomeric siloxanes in continuous operation.

Continuous processes for "polymer-analogous reactions" are not known, polymer-analogous reactions being defined as chemical reactions on macromolecules which do not cause changes in their backbone and leave their degree of polymerization unchanged. An example of such a reaction is the saponification of poly(vinyl acetate).

DISCLOSURE OF INVENTION

The object of the present invention was to develop a continuous process by which reactive groups on polymers can be continuously reacted in a polymer-analogous manner with monomeric, oligomeric or polymeric reactants.

DESCRIPTION OF THE PREFERRED EMBODIMENTS

Figure 1:
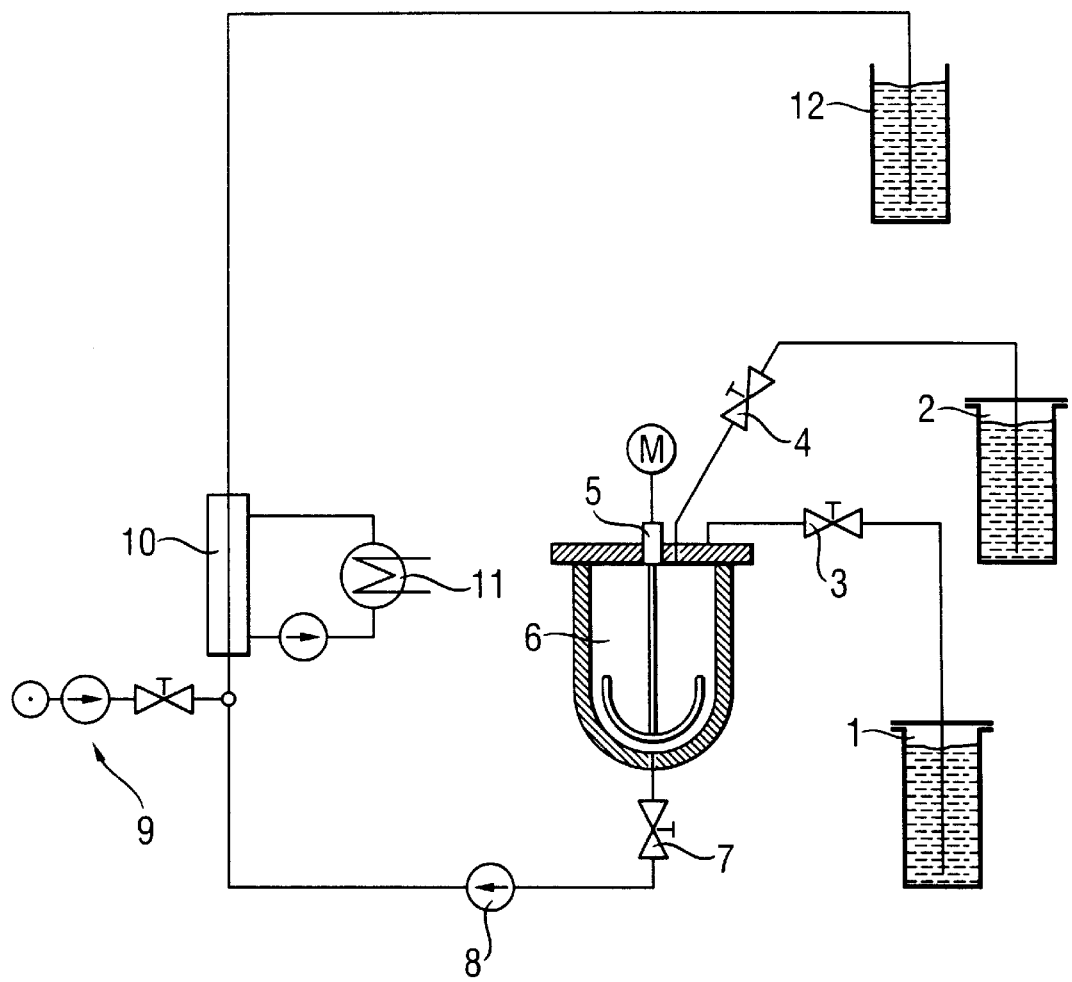
FIG. 1 illustrates one embodiment of a polymer-analogous reaction.

The invention relates to a continuous process for the polymer-analogous reaction of polymers bearing functional groups with reactive compounds, in which, in a first step, a mixture is prepared from the polymers bearing functional groups and the reactive compounds, and in a second step the mixture is conducted continuously through a reaction zone and brought to reaction there.

In this continuous process, the starting materials are continuously conducted once through a reaction zone and continuously brought to reaction. The polymers bearing functional groups need not be homogeneously miscible with the reactive compounds.

Using the present process, the polymers can be reacted with monomeric, oligomeric or polymeric reactants.

"Polymer" is taken to mean a substance whose molecules are characterized by multiple repetition of one or more types of atoms or groups of atoms (units). The number of units linked together here is so high that the properties of the substance do not change by the addition or release of one or more units. In particular, in the present application, a polymer is made up, on average, of at least eight units.

"Oligomer" is taken to mean a substance in whose molecules a few atoms or groups of atoms (units) are repeatedly linked with one another. The physical properties change by addition or release of one or more units. In particular, in the present application, an oligomer is made up of from 2 to 7 units.

In comparison with the batch preparation process and even in comparison with some continuous monomer preparation processes, e.g. with the hydrosilylation of silanes, very short residence times of the starting materials in the reaction zone are sufficient to achieve a complete conversion in one reactor path. The degree of conversion is termed complete when at least 95 mol % of the functional groups on the polymer backbone have reacted.

Calorimetric experiments show that in the case of the polymer-analogous batch process, the hydrosilylation reaction takes place in a time frame from approximately 3 to 30 minutes to achieve complete conversion. The particular time is dependent on the starting materials. If appropriate, in the batch process, the catalyst or a starting material must often be replenished, in order to achieve a complete conversion.

In the present continuous process, however, the mean residence time is in a time frame which, with comparable starting materials, is lower by a factor of from 5 to 300, without taking into account the heating-up and cooling-down phases which are of long duration in a batch process.

The main reason for the short residence times in the reaction zone is that, in the continuous process, in each volume element new, highly reactive catalyst and as yet thermally unstressed starting materials are brought to reaction. In contrast, in the batch process, although the reaction starts off rapidly, the rate of reaction decreases with time, since the catalyst activity decreases and/or the starting materials during the long thermal stress participate in chemical side-reactions, for example α,β-olefin rearrangement, which remove them from the actual polymer-analogous reaction. A further reason for the short residence time is the considerably improved local mixing and more uniform temperature distribution per volume element in the present continuous process. The shortened thermal stress in the present continuous process also leads to a significant product improvement.

To explain the process, reference is made below to FIG. 1.

The starting materials and, if appropriate, the catalyst are metered from reservoirs (1,2) continuously via valves (3,4)

into premixing chamber (6) provided with a mixer (5) or into the premixing zone of the continuous reactor. After this mixing operation, the starting material mixture is transported via valve (7) and metering unit (8) into the reaction zone (10) of the continuous reactor. On passing through the reaction zone (10), the starting material mixture reaches the reaction temperature, reacts to completion and leaves the reaction zone (10) of the continuous reactor again. The product can, if appropriate, be subjected to yet further process steps, such as a short-path distillation or a filtration. The product is then cooled and collected in the receiver (12).

In the case of catalytic processes, it may be necessary to meter a catalyst via metering unit (9). The catalyst can be present here in the liquid or solid state or dissolved in suitable solvents, or as a fixed-bed catalyst.

The catalyst can be metered in this process continuously at various positions at various points in time. The catalyst can be added in the premixing chamber (6) or in the premixing zone or in the heating-up zone. In a third variant, the catalyst can be added continuously directly in the reaction zone (10) after the desired reaction temperature of the starting materials is achieved. The catalyst can be metered by suitable pumping systems. Suitable pumping systems are in this case, for example, microprecision metering pumps, piston pumps etc. The amounts of the catalyst added continuously may be defined with precision here, e.g. via the free length of travel of the micrometering pump. When suitable fluidized-bed catalysts are used, metering of catalyst is not necessary.

The starting materials can be metered continuously in the ratio required via pumps, pressure lines or suction lines. Amounts can be determined here in combination with balances or flow meter devices. The starting materials here can have temperatures of from −20° C. to 100° C., preferably from 0° C. to 60° C. and particularly preferably from 10° C. to 35° C.

When pressure lines and pumps are used, the entire flowthrough process can be controlled by the pumps or the line pressure (e.g. nitrogen pressure line), i.e. the residence time of the starting materials in the reaction zone (10) of the continuous reactor is determined via the pumping rate or the line pressure present.

In the process variant having an upstream temperature-controllable continuous premixing chamber, the starting material mixture can be pumped from a separate pump into the continuous reactor. In this variant, controlling the residence time of the starting materials in the reaction zone (10) of the continuous reactor is possible using this one pump.

The metering of starting materials is likewise possible at various places, at different temperatures and time points, similarly to the metering of catalyst.

The starting materials can be mixed in the mixing chamber by suitable mixing devices (5). Suitable mixing devices (5) are, for example, agitators, ultrasound etc. The temperature in the premixing chamber (6) can be chosen freely in this case. Preference is given to from 10° C. to 35° C.

In the continuous reactor, mixing can be performed, for example, by static mixers or active mixing by agitator tools running parallel to the longitudinal axis of the reactor vessel. These agitator tools can be driven externally or can be set in motion by the liquid flowing past.

Mixing and swirling effects in the continuous reactor can also be achieved by fixed or exchangeable vortex disrupters on the wall of the reactor. In the continuous reactor, the mixing can also be achieved by means of charged packings. Suitable packings are for example glass spheres, hollow ceramic or glass bodies, metal turnings etc.

Use can be made of all current reactor geometries and shapes, such as are described, for example, in Kirk-Othmer, Encyclopedia of Chemical Technology, J. Wiley & Sons, 4th edition, volume 20, pages 1007 to 1059. Particular preference is given to a cylindrical reactor shape, where the ratio of diameter to length can be varied as desired, such as from 1 to 10 to 1 to 2500. The position of the reactor is as desired. The reactor material can vary considerably, and may be metal, such as chrome-vanadium-steel reactors or enameled steel reactors, glass reactors, etc.

The reactor is operated in a temperature range from −50° C. to +400° C. Preference is given to from 0° C. to 250° C. and particular preference to from 60° C. to 200° C. The heating/cooling can be achieved by suitable heating/cooling devices (11). Suitable heating/cooling devices (11) include an oil circuit for heating and cooling, or two independent cooling and heating circuits based on oil or brime, radiant furnaces, heating fans, and vapor heating systems of all types, such as steam heating.

The reactor can be operated at the above specified operating temperatures in an absolute pressure range from vacuum, i.e. 1 mbar, to 300 bar.

The throughput, i.e. the flowthrough of starting material or product per time unit, can vary as a function of reactor size, i.e. reactor length and diameter, reaction parameters, i.e. reaction temperature, viscosity of the starting materials and of the product, exothermy of the reaction etc., and reaction kinetics, from 100 g per hour to 1000 kg per hour of starting material. Preference is given to turnovers of from 1 kg per hour to 500 kg per hour. Particular preference is given to from 10 kg to 100 kg per hour throughput of starting material.

The throughput can be controlled as described above via the continuous metering units (8). Another method of controlling throughput of starting material is an electronically actuatable or manually operable outlet valve or control valve at any desired point in the reactor downstream of the reaction zone (10) or at the end of the reactor. In this case, the transport devices, such as pumps, pressure lines etc., must transport not only against the viscosity of the starting materials and products, but also against a certain constant, freely settable pressure, of the built-in control valve. This type of flow control is particularly preferred.

Optionally, downstream of the reaction zone, any desired heating/cooling zone can be connected, in order to set the resultant products to a temperature optimum for the further processing or process steps.

The product quality is preferably continuously monitored by on-line measurement methods. Suitable measurement methods are all those which can detect the degree of conversion of the reaction in a sufficiently short time. These are, for example, spectroscopic measurement methods, such as near infrared spectroscopy, FT-IR spectroscopy, Raman and FT-Raman spectroscopy.

The mixture prepared in the first step of the present continuous process is preferably liquid at the conditions prevailing in the reaction zone (10). Preferably, the mixture has a viscosity of at most 10,000 mPa•s.

The present continuous process is suitable for all polymer-analogous reactions, such as addition reactions, e.g. hydrosilylations, Michael addition, condensation reactions, metathesis reactions, nucleophilic substitutions, such as esterifications, ester cleavages etc., and electrophilic substitutions etc.

Preferably, in the present continuous process, as polymers, use is made of functional polyorganosiloxanes, and functionalized polyethers such as polyoxyethylene ethers, polyoxypropylene ethers, or polyoxyethylene/polyoxypropylene copolyethers.

Preferred polyoxyethylene ethers, polyoxypropylene ethers and polyoxyethylene/polyoxypropylene copolyethers have the general formula 1

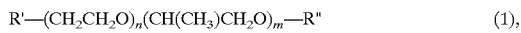

$$R'-(CH_2CH_2O)_n(CH(CH_3)CH_2O)_m-R'' \quad (1),$$

where
- R' and R'' are each a hydroxyl group, a primary, secondary or tertiary amino group, a mercapto group, or a $C_1$–$C_{20}$ hydrocarbon radical which is unsubstituted or substituted by $C_1$–$C_{10}$-alkoxy groups, cyano groups or fluorine, chlorine or bromine and has at least one aliphatically unsaturated functional group,
- n and m are each from 0 to 100 and the sum of n+m has a mean value of at least 8.

Preferably, the hydrocarbon radicals R' and R'' have a maximum of 6 carbon atoms.

Preferably, the sum of n+m has a mean value of at least 20.

Preferred polyoxyethylene/polyoxypropylene copolyethers of the general formula 1 are freely variable in structure from block copolymers to strictly alternating copolymers.

Particular preference in the present continuous process is given to use as polymers of polyorganosiloxanes which have at least one unit of the general formula 2

$$A_aE_bSiO_{\frac{4-a-b}{2}} \quad (2)$$

where
- A is a functional group
- E is an inert group
- a is 1, 2 or 3 and
- is 0, 1 or 2.

Preferably, the functional groups A are selected from the groups —H, —OH, —X, —OR, —$R^1$, —$O^-M^+$,
where
- X is fluorine, chlorine or bromine,
- R is a $C_1$–$C_{20}$-hydrocarbon radical which is unsubstituted or substituted by $C_1$–$C_{10}$-alkoxy groups, cyano groups or fluorine, chlorine or bromine, and
- $R^1$ is a $C_2$- to $C_{60}$-hydrocarbon radical which bears one or more double and/or triple bonds, may be interrupted by heteroatoms, such as O, S, N, and P, and can be unsubstituted or substituted by cyano groups, isocyanate groups, fluorine, chlorine or bromine, primary, secondary or tertiary amino groups, carboxylic acid groups or derivatives thereof, primary, secondary or tertiary alcohols or phenols, aldehyde, keto, epoxide or vinyl ether groups and
- M+ is a metal cation.

Examples of $R^1$ are the ethylene, propene, and acetylene radicals, the acrylate and methacrylate radicals, esters, anhydrides etc.

Preferably, R is an unsubstituted or substituted $C_1$–$C_6$-hydrocarbon radical.

Preferably, $R^1$ is an unsubstituted or substituted $C_2$ $C_{12}$-hydrocarbon radical.

Compounds which are particularly suitable for the present continuous process are the polyorganosiloxanes in which the functional groups A are —H.

Preferred metal cations are the alkali metal cations, alkaline earth metal cations, and the cations of aluminum.

Preferably, the inert groups E are selected from $C_1$- to $C_{20}$-hydrocarbon radicals which are unsubstituted or substituted by $C_1$–$C_{10}$-alkoxy groups, cyano groups, or fluorine, chlorine or bromine atoms.

EXAMPLES

Example 1

Hydrosilylation

Using a gearwheel pump (ISMATEC BVZ), a starting material mixture is pumped through a heatable cylindrical stainless steel reactor (V4A steel, in-house construction) having a length of 1 m and a nominal capacity of 50 ml. When catalyst solutions are used, these are pumped with a micrometering pump (Havard Apparatus 44). The catalyst solution used is a 1% strength by weight solution of hexachloroplatinic acid in isopropanol. The reactor is packed with approximately 17 g of glass tubes of length approximately 0.5 cm and diameter approximately 0.3 cm. In the case of fixed-bed catalysts, there is no metering of catalyst or charging the reactor with glass pieces.

Downstream of the reaction zone, the product is cooled to room temperature by a cooler and collected in a product vessel.

The starting materials, solvents and catalysts used, the preparation conditions, such as flow per unit time, reaction temperature ($T_{reactor}$), residence time in the reactor ($t_{res}$) and the products thus prepared are summarized below in tabular form.

TABLE 1 homogeneous continuous hydrosilylation

| Si—H starting material | α-vinyl starting material | Catalyst [ppm] | Flow [g/min] | $t_{res}$[5) [min] | $T_{reactor}$ [° C.] | Product group |
|---|---|---|---|---|---|---|
| Silicone oil 1 | Allyl alcohol | 20 ppm | 60 | 0.7 | 120 | Carbinol siloxane oil |
| Silicone oil 2 | Allyl alcohol | 20 ppm | 70 | 0.6 | 125 | Carbinol siloxane oil |
| Silicone oil 1 | Allyl alcohol | fixed bed 1 | 50 | 0.85 | 125 | Carbinol siloxane oil |
| Silicone oil 1 | Allyl alcohol | fixed bed 2 | 50 | 0.85 | 120 | Carbinol siloxane oil |
| Silicone oil 1 | Allyl alcohol | fixed bed 3 | 50 | 0.85 | 120 | Carbinol siloxane oil |
| Silicone oil 1 | triallyl amine | 100 ppm | 40 | 0.95 | 130 | amino siloxane |
| Silicone oil 2 | triallyl amine | 100 | 40 | 0.95 | 130 | amino siloxane |
| Silicone oil 2 | triallyl amine | fixed bed 3 | 40 | 0.95 | 130 | amino siloxane |
| Silicone oil 1 toluene | allyl polyoxyethylene polyether | 30 | 40 | 0.95 | 145 | (EO) copolymer |
| Silicone oil 1 toluene | allyl polyoxyethylene polyether | fixed bed 3 | 60 | 0.7 | 145 | (EO) copolymer |
| Silicone oil 2 | allyl polyoxy- | 30 | 45 | 0.95 | 150 | (EO) copolymer |
| Silicone oil 2 | allyl polyoxypropylene polyether[2)] | 30 | 40 | 0.95 | 140 | (PO) copolymer |
| Silicone oil 1 | allyl polyoxypropylene polyether[2)] | fixed bed 2 | 20 | 1.9 | 140 | (PO) copolymer |

TABLE 1-continued homogeneous continuous hydrosilylation

| Si—H starting material | α-vinyl starting material | Catalyst [ppm] | Flow [g/min] | $t_{res}$[5] [min] | $T_{reactor}$ [°C.] | Product group |
|---|---|---|---|---|---|---|
| Silicone oil 3 | allyl polyoxypropylene polyether[2] | fixed bed 3 | 40 | 0.95 | 130 | (PO) copolymer |
| Silicone oil 2 | allyl glycidyl ether | 15 | 100 | 0.42 | 120 | epoxy-siloxane |
| Silicone oil 1 | allyl glycidyl ether | 15 | 100 | 0.42 | 120 | epoxy-siloxane |
| Silicone oil 2 | dodecene | 15 | 100 | 0.42 | 120 | alkyl-siloxane oil |
| Silicone oil 2 | eugenol | fixed bed 2 | 100 | 0.42 | 120 | aryl-siloxane oil |
| Silicone oil 3 | octa-decene | 10 | 10 | 4.2 | 200 | alkyl-siloxane oil |
| Silicone oil 1 butanol | Pluriol[3] | fixed bed 3 | 25 | 1.7 | 130 | acrylate silicone oil |
| Triethoxy-silane | Pluriol[3] | 100 | 25 | 1.7 | 130 | acrylate ethylene glycol disilane |
| Dimethyl-chloro-silane | silicone oil 4 | 7.7 | 20 | 2.13 | 120[4] | branched siloxane |
| Silicone oil 2 | tertbutyl vinyl-acetate | 25 | 15 | 2.85 | 120 | carboxylic acid silicone oil derivatives |
| Silicone oil 2 | allyl succinic anhydride | fixed bed 3 | 30 | 1.42 | 130 | carboxylic acid silicone oil derivatives | silicone oil 1: $HMe_2SiO(Me_2SiO)_{30}SiMe_2H$
silicone oil 2: $Me_3SiO(Me_2SiO)_{25}(HMeSiO)_4SiMe_3$
silicone oil 3: $Me_3SiO(HMeSiO)_{50}SiMe_3$
silicone oil 4: $Me_3SiO(Me_2SiO)_{100}(MeSi(CH=CH_2)O)_6SiMe_3$ Fixed-bed catalyst 1: 5% by weight platinum on aluminum oxide, obtainable from Heraeus, type Bd 2/28
Fixed-bed catalyst 2: 5% by weight platinum on activated carbon, obtainable from Heraeus, type Dc13/13
Fixed-bed catalyst 3: 5% by weight platinum on aluminum oxide, obtainable from Heraeus, type K-0156

1) $H_2C=CHCH_2O(CH_2CH_2O)_5CH_2CH_2OAc$ (Grünau)
2) $H_2C=CHCH_2O(CHCH_3CH_2O)_9CH_3$ (BASF)
3) $(=CHCH_2O(CH_2CH_2O)_2\ CH_2CH_2OC(O)CH=CH_2)_2$ (BASF)
4) Reaction is run at 5 bar gauge pressure.
5) The residence time of the starting materials and of the product is calculated from equation 1:

$t_{res} = (V_{reactor} - V_{packing})/\rho \cdot \text{flow rate}$ [min]

where $\rho$ = density of the product in g/cm³
$V_{reactor}$ = nominal capacity of the reactor
$V_{packing}$ = (weight of the packing) (density of the packing)

The resultant products all have a hydrogen number which corresponds to an Si—H group conversion rate greater than 95 mol %. In addition, the compounds prepared using fixed-bed catalysts no longer contain detectable platinum and are colorless clear products.

Example 2
Continuous Hydrosilylation with Variable Metering of Starting Material The reactor structure is identical to that described in Example 1. However, in addition, a third starting material is further added to the continuous reactor downstream of a reaction path of 65 cm to the first two starting materials which by then have already reacted completely to form an intermediate which is not isolated. The catalyst solution used is a 1% strength by weight solution of hexachloroplatinic acid in isopropanol.

TABLE 2

Continuous hydrosilylation using two hydrosilylable starting materials added successively

| Si—H starting material | α-vinyl starting material 1 | α-vinyl starting material 2 | Catalyst [ppm] | $t_{res}$ [min] | Flow rate [g/min] | $T_{reactor}$ [°C.] |
|---|---|---|---|---|---|---|
| Silicone oil 3 | α-methyl styrene | dodecene | 5 | 2.13 | 20 | 200 |
| Silicone oil 3 | octadecene | triallyl-amine | 10 | 4.26 | 10 | 150 |
| Silicone oil 2 | tertbutyl vinyl acetate | 1-octene | 10 | 4.26 | 10 | 130 |

The resultant products all have a hydrogen number which corresponds to an Si—H group conversion greater than 96 mol %.

Example 3
Continuous Nucleophilic Substitution

The reactor structure is identical to that in Example 1, with the difference that no catalyst is added. The products produced in the continuous process are subsequently purified via a short-path distillation and a filtration.

TABLE 3

Continuous Si—OC linkage

| Alkoxide | Si—H starting material | Flow rate [g/min] | $T_{reactor}$ [°C.] | $T_{res}$ [min] |
|---|---|---|---|---|
| $BuO(PO)_{15}$ $^-K^+$ | Silicone oil 1 | 5 | 180 | 8.52 |
| $MeO(EO)_{30}$ $^-Li^+$ | Silicone oil 1 | 20 | 150 | 2.13 |
| $BuO(PO)_{15}$ $^-K^+$ | Silicone oil 2 | 10 | 200 | 4.26 |
| $MeO(EO)_{30}$ $^-Li^+$ | Silicone oil 2 | 20 | 140 | 2.13 |

Quantitative Si—O—C linkage is demonstrated in $^{29}Si$—NMR.

Example 4
Two-stage Synthesis in the Continuous Reactor
Process:

The reactor structure is identical to that in Example 1. The catalyst solution used for the hydrosilylation is a 1% strength by weight solution of hexachloroplatinic acid in isopropanol. In departure from Example 1, in addition, p-toluenesulfonic acid, 5% by weight in toluene, is added at approximately one third of the reactor length as catalyst for ester cleavage via a microprecision pump.
Reaction:

In the first third of the reactor, a hydrosilylation is carried out. This is then followed, without isolation of the intermediate, by an acid ester hydrolysis catalyzed by p-toluenesulfonic acid, with elimination of butene. The resultant product is then further purified continuously by a short-path distillation. The exact reaction parameters are given in Table 4.

TABLE 4

Preparation of a siloxane oil containing free carboxylic acid groups

| 1st step | | 2nd step | Reaction conditions for both steps | | |
|---|---|---|---|---|---|
| Si—H starting material | t-butyl α-olefin carboxylate | p-TSO$_3$H/ toluene | T$_{reactor}$ [° C.] | t$_{res}$ [min] | Flow rate [g/min] |
| Silicone oil 2 | tertbutyl vinyl-acetate (Merck) | 0.1 ml/min | 150 | 8.52 | 5 |
| Silicone oil 2 | tertbutyl 1-undecen-oate | 0.1 ml/min | 150 | 8.52 | 5 |

The resultant products are characterized by $^1$H—NMR

We claim:

1. A continuous process for the polymer-analogous reaction of organopolysiloxane polymers bearing functional groups with a reactive compound, comprising a) in a first step, preparing a mixture of the organopolysiloxane polymers bearing functional groups and the reactive compound, b) in a second step, conducting the mixture continuously through a reaction zone and reacting said mixture there, wherein said reaction is a hydrosilylation reaction, and said polyorganosiloxane polymer bears hydrosilylatable unsaturated hydrocarbon groups or ≡Si—H groups; wherein said reactive compound contains a ≡Si—H group as a reactive group when said organopolysiloxane polymer bears hydrosilylatable unsaturated hydrocarbon groups, and said reactive compound contains a hydrosilylatable unsaturated group as a reactive group when said organopolysiloxane polymer bears ≡Si—H groups; and wherein the reaction takes place in the presence of an effective amount of at least one hydrosilylation catalyst.

2. The process as claimed in claim 1, wherein said organopolysiloxane comprises an organopolysiloxane containing at least one unit of the general formula 2

$$A_aE_bSiO_{\frac{4-a-b}{2}} \tag{2}$$

where
   A is an unsaturated hydrocarbon group or —H,
   E is an inert group which is unreactive under the process conditions,
   a is 1, 2 or 3,
   b is 0, 1 or 2, and
   the sum of a+b<3.

3. The process as claimed in claim 2, in which the inert groups E are selected from C$_1$–C$_{20}$-hydrocarbon radicals which are unsubstituted, or substituted by C$_1$–C$_{10}$-alkoxy groups, cyano groups, fluorine, chlorine, or bromine.

4. The process of claim 2, wherein said unsaturated hydrocarbon group is a C$_2$–to C$_{60}$-hydrocarbon radical which bears one or more double and/or triple bonds, optionally interrupted by one or more heteroatoms O, S, N, and/or P, and are unsubstituted, or substituted by cyano groups, isocyanate groups, fluorine, chlorine or bromine, primary, secondary or tertiary amino groups, carboxylic acid groups or derivatives thereof, primary, secondary or tertiary alcohols or phenols, aldehyde, keto, epoxide or vinyl ether groups.

5. The process of claim 1, wherein the polyorganosiloxanes have the functional groups ≡SiH.

6. The process of claim 2, wherein the polyorganosiloxanes have the functional groups ≡SiH.

7. The process of claim 3, wherein the polyorganosiloxanes have the functional groups ≡SiH.

8. The process of claim 1 wherein the degree of polymerization of said polymer does not change during the course of the reaction.

9. The process of claim 1, wherein said hydrosilylation is at least 95% complete based on mols of reactive =SiH and mols of unsaturated hydrocarbon groups.

10. The process of claim 1, wherein said hydrosilylation catalyst is a supported catalyst contained in a fixed bed.

11. The process of claim 1, wherein said organopolysiloxane bears ≡SiH reactive functionality, and wherein at least two different unsaturated hydrocarbons are employed as reactive compounds.

12. The process of claim 11 wherein said two unsaturated hydrocarbons are employed successively as reactive compounds without isolation of any intermediate composition.

* * * * *